(12) United States Patent
Eaton et al.

(10) Patent No.: US 8,300,924 B2
(45) Date of Patent: *Oct. 30, 2012

(54) TRACKER COMPONENT FOR BEHAVIORAL RECOGNITION SYSTEM

(75) Inventors: John Eric Eaton, Houston, TX (US); Wesley Kenneth Cobb, The Woodlands, TX (US); Rajkiran K. Gottumukkal, Houston, TX (US); Kishor Adinath Saitwal, Houston, TX (US); Ming-Jung Seow, Houston, TX (US); Tao Yang, Katy, TX (US); Bobby Ernest Blythe, Houston, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 1051 days.

This patent is subject to a terminal disclaimer.

(21) Appl. No.: 12/208,538

(22) Filed: Sep. 11, 2008

(65) Prior Publication Data

US 2009/0087085 A1    Apr. 2, 2009

Related U.S. Application Data

(60) Provisional application No. 60/975,559, filed on Sep. 27, 2007.

(51) Int. Cl.
*G06K 9/62* (2006.01)

(52) U.S. Cl. .......................... 382/159; 382/155

(58) Field of Classification Search .................. None
See application file for complete search history.

(56) References Cited

U.S. PATENT DOCUMENTS

| | | | |
|---|---|---|---|
| 4,679,077 A | 7/1987 | Yuasa et al. |
| 4,998,162 A | 3/1991 | Kondo et al. |
| 5,091,780 A | 2/1992 | Pomerleau |
| 5,113,507 A | 5/1992 | Jaeckel |
| 5,677,733 A | 10/1997 | Yoshimura et al. |
| 5,748,775 A | 5/1998 | Tsuchikawa et al. |
| 5,751,378 A | 5/1998 | Chen et al. |
| 5,969,755 A | 10/1999 | Courtney |
| 6,252,974 B1 | 6/2001 | Martens et al. |
| 6,263,088 B1 | 7/2001 | Crabtree et al. |
| 6,532,022 B1 | 3/2003 | Ahmad |
| 6,570,608 B1 | 5/2003 | Tserng |
| 6,642,940 B1 | 11/2003 | Dakss et al. |

(Continued)

FOREIGN PATENT DOCUMENTS

WO    2005/096215 A1    10/2005

(Continued)

OTHER PUBLICATIONS

PCT International Search Report & Written Opinion for PCT/US08/53457, dated July 22, 2008.

(Continued)

*Primary Examiner* — Jingge Wu
*Assistant Examiner* — Nirav G Patel
(74) *Attorney, Agent, or Firm* — Patterson & Sheridan LLP (57) ABSTRACT

A tracker component for a computer vision engine of a machine-learning based behavior-recognition system is disclosed. The behavior-recognition system may be configured to learn, identify, and recognize patterns of behavior by observing a video stream (i.e., a sequence of individual video frames). The tracker component may be configured to track objects depicted in the sequence of video frames and to generate, search, match, and update computational models of such objects.

25 Claims, 9 Drawing Sheets

U.S. PATENT DOCUMENTS

| | | |
|---|---|---|
| 6,661,918 B1 | 12/2003 | Gordon et al. |
| 6,674,877 B1 | 1/2004 | Jojic et al. |
| 6,678,413 B1 | 1/2004 | Liang et al. |
| 6,825,769 B2 | 11/2004 | Colmenarez et al. |
| 6,856,249 B2 | 2/2005 | Strubbe et al. |
| 6,940,998 B2 | 9/2005 | Garoutte |
| 7,034,833 B2 | 4/2006 | Epshteyn |
| 7,076,102 B2 | 7/2006 | Lin et al. |
| 7,136,097 B1 | 11/2006 | Toyoda et al. |
| 7,136,525 B1 | 11/2006 | Toyama et al. |
| 7,158,680 B2 | 1/2007 | Pace |
| 7,200,266 B2 | 4/2007 | Ozer et al. |
| 7,227,893 B1 | 6/2007 | Srinivasa et al. |
| 7,236,190 B2 | 6/2007 | Yanof et al. |
| 7,254,268 B2 | 8/2007 | Zhao et al. |
| 7,308,136 B2 | 12/2007 | Curry et al. |
| 7,349,574 B1 | 3/2008 | Sodini et al. |
| 7,436,887 B2 | 10/2008 | Yeredor et al. |
| 7,508,455 B2 | 3/2009 | Liu et al. |
| 7,535,511 B2 | 5/2009 | Wu et al. |
| 7,639,741 B1 | 12/2009 | Holt et al. |
| 7,710,466 B2 | 5/2010 | Drader et al. |
| 7,825,954 B2 | 11/2010 | Zhang et al. |
| 7,868,912 B2 | 1/2011 | Venetianer et al. |
| 7,929,729 B2 | 4/2011 | Huang et al. |
| 8,131,012 B2 | 3/2012 | Eaton et al. |
| 2003/0107650 A1 | 6/2003 | Colmenarez et al. |
| 2004/0032906 A1 | 2/2004 | Lillig |
| 2004/0151342 A1 | 8/2004 | Venetianer et al. |
| 2004/0151374 A1 | 8/2004 | Lipton et al. |
| 2004/0162827 A1 | 8/2004 | Nakano |
| 2005/0001759 A1* | 1/2005 | Khosla .................. 342/90 |
| 2005/0104958 A1 | 5/2005 | Egnal et al. |
| 2005/0105765 A1 | 5/2005 | Han et al. |
| 2005/0219362 A1 | 10/2005 | Garoutte |
| 2005/0240629 A1 | 10/2005 | Gu et al. |
| 2005/0259848 A1 | 11/2005 | Garoutte |
| 2005/0286764 A1 | 12/2005 | Mittal et al. |
| 2006/0018516 A1* | 1/2006 | Masoud et al. ............ 382/115 |
| 2006/0165386 A1 | 7/2006 | Garoutte |
| 2006/0190419 A1 | 8/2006 | Bunn et al. |
| 2006/0221181 A1 | 10/2006 | Garoutte |
| 2006/0222206 A1 | 10/2006 | Garoutte |
| 2006/0225120 A1 | 10/2006 | Lee et al. |
| 2007/0092149 A1 | 4/2007 | Sung |
| 2007/0263900 A1 | 11/2007 | Medasani et al. |
| 2008/0002856 A1 | 1/2008 | Ma et al. |
| 2008/0089561 A1* | 4/2008 | Zhang .................. 382/118 |
| 2008/0181453 A1 | 7/2008 | Xu et al. |
| 2008/0181499 A1 | 7/2008 | Yang et al. |
| 2008/0193010 A1 | 8/2008 | Eaton et al. |
| 2008/0240496 A1 | 10/2008 | Senior |
| 2008/0252723 A1 | 10/2008 | Park |
| 2008/0266413 A1 | 10/2008 | Cohen et al. |
| 2009/0022364 A1* | 1/2009 | Swaminathan et al. ...... 382/103 |
| 2009/0067716 A1 | 3/2009 | Brown et al. |
| 2009/0087024 A1 | 4/2009 | Eaton et al. |
| 2009/0087085 A1 | 4/2009 | Eaton et al. |
| 2009/0087086 A1 | 4/2009 | Eaton et al. |
| 2009/0087093 A1 | 4/2009 | Eaton et al. |
| 2009/0087096 A1 | 4/2009 | Eaton et al. |
| 2009/0210367 A1 | 8/2009 | Armstrong et al. |
| 2009/0297023 A1 | 12/2009 | Lipton et al. |
| 2009/0324107 A1 | 12/2009 | Walch |
| 2010/0063949 A1 | 3/2010 | Eaton et al. |
| 2010/0124378 A1 | 5/2010 | Das et al. |
| 2010/0150471 A1 | 6/2010 | Cobb et al. |
| 2010/0208986 A1 | 8/2010 | Cobb et al. |
| 2010/0260376 A1 | 10/2010 | Cobb et al. |

FOREIGN PATENT DOCUMENTS

| | | |
|---|---|---|
| WO | 200949314 A2 | 4/2009 |

OTHER PUBLICATIONS

S. Apewokin, et al. "Multimodal Mean Adaptive Backgrounding for Embedded Real-Time Video Surveillance," (2007) IEEE 6 pages.

Chris Stauffer, et al. "Adaptive Background Mixture Models for Real-Time Tracking," The Artificial Intelligence Laboratory, Massachussetts Institute of Technology 7 pages.

Ahmed Elgammal, et al. "Non-parametric Model for Background Substraction," Computer Vision Laboratory, University of Maryland 17 pages.

Ismail Haritaoglu, et al. "W4: Real-Time Surveillance of People and Their Activities," IEEE Transactions on Pattern Analysis and Machine Intelligence, vol. 22, No. 8 (Aug. 2000) pp. 809-830.

Yuri Ivanov, et al. "Video Surveillance of Interactions," MIT Media Laboratory, Cambridge, MA 8 pages.

Chris Stauffer, et al. "Learning Patterns of Activity Using Real-Time Tracking," Artificial Intelligence Laboratory, Massachussetts Institute of Technology, Cambridge, MA 17 pages.

Pentti Kanerva, "Sparse Distributed memory and Related Models," M.H. Hassoun, ed., Associative Neural Memories: Theory and Implementation, pp. 50-76. New York: Oxford University Press (1993).

Ismail Haritaoglu, et al. "Ghost: A Human Body Part Labeling System Using Silhouettes," 14th International Conference on Pattern Recognition, Aug. 16-20, 1998. pp. 1-6.

Andrew Senior, et al. "Appearance Models for Occlusion Handling," IBM T.J. Watson Research Center, Yorktown, Heights, NY. 8 pages.

J. Connell, et al. "Detection and Tracking in the IBM PeopleVision System," IBM T.J. Watson Research Center, Yorktown Heights, NY pp. 1-4.

Richard Nock et al., "Statistical Region Merging," IEEE Transactions on Pattern Analysis and Machine Intelligence, Nov. 2004, vol. 26(11): pp. 1452-1458.

Helmut Grabner et al., "On-line Boosting and Vision," IEEE Conference on Computer Vision and Pattern Recognition (CVPR), Jun. 2006, vol. 1: pp. 260-267.

* cited by examiner

UPDATE OBJECT MODEL

FIG. 6C

TRACKER COMPONENT FOR BEHAVIORAL RECOGNITION SYSTEM

CROSS REFERENCE TO RELATED APPLICATION

This application claims benefit of U.S. Provisional Patent Application Ser. No. 60/975,559 filed Sep. 27, 2007. This application also relates to commonly assigned, co-pending U.S. patent application Ser. No. 12/028,484 filed Feb. 8, 2008, entitled "Behavioral Recognition System", both of which are incorporated herein by reference in their entirety.

BACKGROUND OF THE INVENTION

1. Field of the Invention

Embodiments of the invention provide a tracker component for a behavioral recognition system. More specifically, embodiments of the invention relate to techniques for identifying objects depicted in a sequence of video frames and for generating, matching, and updating computational models of such objects

2. Description of the Related Art

Some currently available video surveillance systems provide simple object recognition capabilities. For example, some currently available systems are configured to identify and track objects moving within a sequence of video frame using a frame-by-frame analysis. These systems typically acknowledge the need to isolate foreground images from background images (i.e., for identifying portions of a scene that depict activity (e.g., people, vehicles, etc.) and portions that depict fixed elements of the scene (e.g., a road or a subway platform). The background essentially provides a stage upon which activity occurs. Contiguous regions of the scene that contain a portion of scene foreground (referred to as a foreground "blob") are identified, and a given "blob" may be matched from frame-to-frame as depicting the same object. That is, the "blob" is tracked as it moves from frame-to-frame within the scene. To be effective, a video surveillance system needs to be able to detect and follow objects within a scene in a quick and efficient manner as the video is captured at a real-time frame rate. Once identified, a "blob" may be tracked from frame-to-frame in order to follow the movement of the "blob" over time, e.g., a person walking across the field of vision of a video surveillance camera.

Further, such systems may be able to determine when an object has engaged in certain predefined behaviors. However, such surveillance systems typically require that the objects and/or behaviors which may be recognized by the system to be defined in advance. Thus, in practice, these systems simply compare recorded video to predefined definitions for objects and/or behaviors. In other words, unless the underlying system includes a description of a particular object or behavior, the system may not recognize that behavior (or at least instances of the pattern describing the particular object or behavior). Thus, to recognize additional objects or behaviors, separate software products may need to be developed. This results in surveillance systems with recognition capabilities that are labor intensive and prohibitively costly to maintain or adapt for different specialized applications. Further, such systems are often unable to associate related aspects from different patterns of observed behavior, e.g., to learn to identify behavior being repeatedly performed by a criminal prior to breaking into cars parked in a parking lot. As a result, by restricting the range of objects that a system may recognize using a predefined set of patterns, many available video surveillance systems have been of limited usefulness.

SUMMARY OF THE INVENTION

Embodiments of the invention provide a tracker component for a behavioral recognition system. One embodiment of the invention includes a method for tracking one or more objects depicted in a sequence of video frames. The method may generally include receiving a current video frame, of the sequence of video frames and receiving a background model of a scene depicted by the sequence of video frames and one or more foreground patches. Each foreground patch includes a set of pixels covered by the foreground patch in the current video frame. The method may also include, for each of the one or more tracked objects: (i) identifying a predicted location of the tracked object; (ii) identifying, at the predicted location, one or more foreground patches; (iii) searching for the tracked object at a plurality of points in the scene using a model of the tracked object generated from one or more previous video frames, of the sequence of video frames; (iv) selecting one of the searched points as a position of the tracked object in the current video frame; and (iv) updating the model of the tracked object based on the selected position of the tracked object in the current video frame. The method may also include passing the updated models of the one or more tracked objects to a machine learning engine configured to identify patterns of behavior engaged in by the tracked objects.

Another embodiment of the invention includes a computer-readable storage medium containing a program which, when executed by a processor, performs an operation for tracking one or more objects depicted in a sequence of video frames. The operation may generally include receiving a current video frame, of the sequence of video frames and receiving a background model of a scene depicted by the sequence of video frames and one or more foreground patches, wherein each foreground patch includes a set of pixels covered by the foreground patch in the current video frame. The operation may also include, for each of the one or more tracked objects: (i) identifying a predicted location of the tracked object; (ii) identifying, at the predicted location, one or more foreground patches; (iii) searching for the tracked object at a plurality of points in the scene using a model of the tracked object generated from one or more previous video frames, of the sequence of video frames; (iv) selecting one of the searched points as a position of the tracked object in the current video frame; and (iv) updating the model of the tracked object based on the selected position of the tracked object in the current video frame. The operation may also include passing the updated models of the one or more tracked objects to a machine learning engine configured to identify patterns of behavior engaged in by the tracked objects.

Still another embodiment of the invention includes a system having a video input source configured to provide a sequence of video frames, each depicting a scene. The system may also include a processor and a memory containing a computer vision engine which when executed by the processor is configured to perform an operation for tracking one or more objects depicted in a sequence of video frames. The operation performed by the computer vision engine may generally include receiving a current video frame, of the sequence of video frames and receiving a background model of a scene depicted by the sequence of video frames and one or more foreground patches, wherein each foreground patch includes a set of pixels covered by the foreground patch in the current video frame. The operation performed by the computer vision engine may also include, for each of the one or more tracked objects: (i) identifying a predicted location of the tracked object; (ii) identifying, at the predicted location, one or more foreground patches; (iii) searching for the tracked object at a plurality of points in the scene using a model of the tracked object generated from one or more previous video frames, of the sequence of video frames; (iv) selecting one of the searched points as a position of the tracked object in the current video frame; and (iv) updating the model of the tracked object based on the selected position of the tracked object in the current video frame. The operation performed by the computer vision engine may also include passing the updated models of the one or more tracked objects to a machine learning engine configured to identify patterns of behavior engaged in by the tracked objects.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide a tracker component for a computer vision engine of a machine-learning based behavior-recognition system. The behavior-recognition system may be configured to learn, identify, and recognize patterns of behavior by observing a video stream (i.e., a sequence of individual video frames). This disclosure describes a tracker component of the behavior recognition system configured to identify objects depicted in the sequence of video frames and to generate, match, and update computational models of such objects. As described, the tracker component is configured to detect and follow objects within a scene in a quick and efficient manner as video of the scene is captured at a real-time frame rate.

In one embodiment, the tracker component receives a current frame of video along with a background/foreground model of the scene depicted by the frame. The tracker component then attempts to track the movement of a given patch as the object depicted in the video moves about the screen. In one embodiment, the tracker component may include a search component, matching component, and an update component. The search component may be configured to search for a given object being tracked from one frame to the next. In one embodiment, a hierarchical block search may be used. Alternatively, a particle filter search may be used. In either case, the search component searches a predicted location for a given object, based on where the object has been recently observed and on kinematic data associated with the object. The matching component may be configured to evaluate and score a match between a given foreground blob and a tracked object. In one embodiment, the tracker component may maintain an appearance based model of a given object. In another embodiment, a feature covariance model may be used. Further, in one embodiment, both models may be used and assigned a measure of confidence, allowing the tracker to follow a given object using the technique that most accurately identifies the movement of that object throughout the scene in a particular case. The update component may update the model representing a given object, based on changes that occur from frame-to-frame, e.g., as an individual walks across the scene. Additionally, the update component may merge, split, or seed models of newly discovered objects as such events are identified from frame-to-frame.

Once the tracker component updates the models of objects being tracked in the scene, it may output this data to other components of the computer vision engine and/or the machine learning engine. As events occur, and re-occur, the machine learning engine may create, encode, store and reinforce patterns representing the events observed to have occurred. Further still, patterns representing an event of interest may result in alert to a user of the behavioral recognition system disclosed herein.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
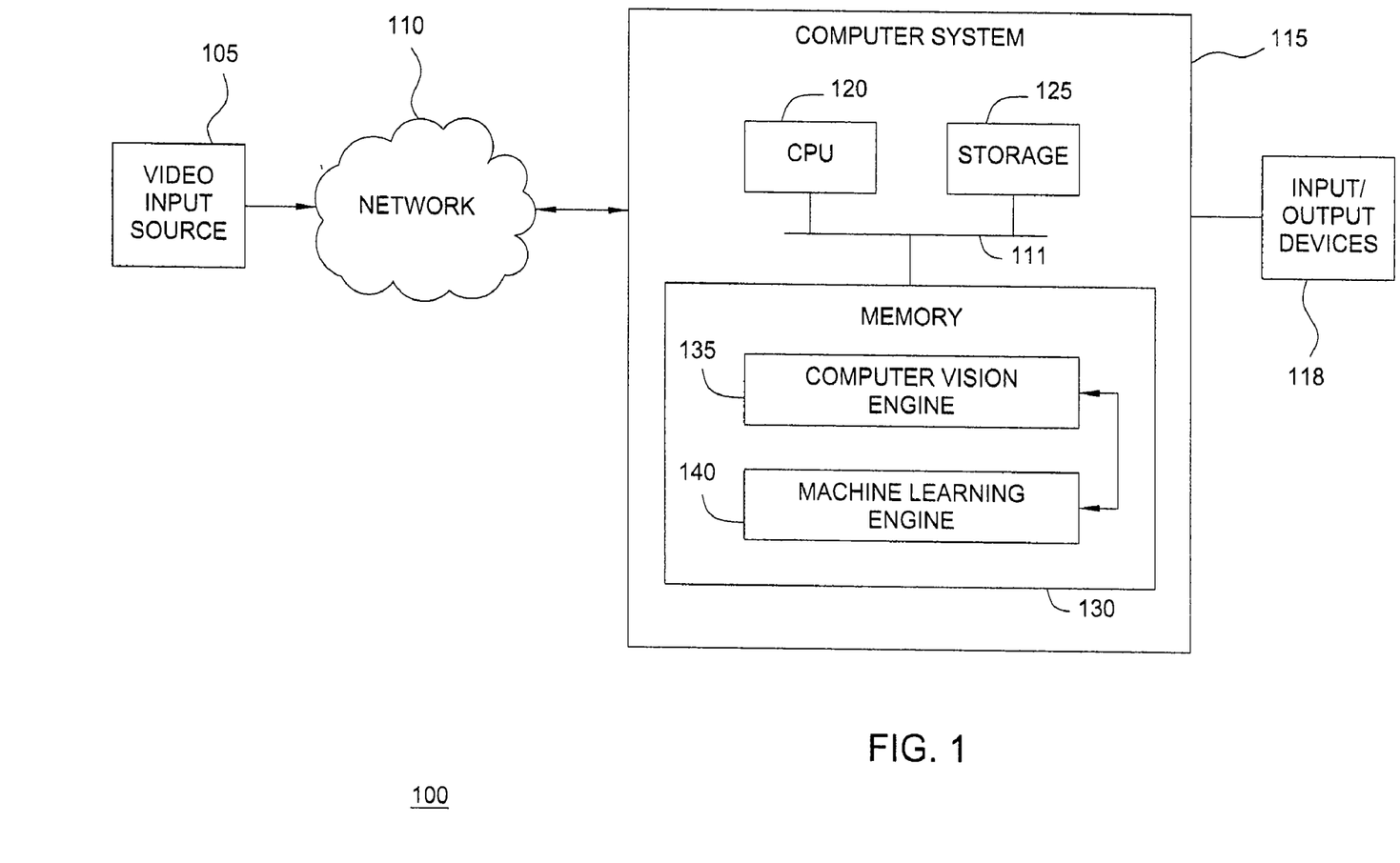
FIG. 1 illustrates components of a behavioral recognition system, according to one embodiment of the present invention.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 114 may transmit video data recorded by the video input 112 to the computer system 115. Illustratively, the computer system 115 includes a CPU 120, storage 125 (e.g., a disk drive, optical disk drive, floppy disk drive, and the like), and a memory 130 containing a computer vision engine 135 and a machine learning engine 140. The computer vision engine 135 and the machine learning engine 140 may provide software applications configured to analyze a sequence of video frames provided by the video input 112.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value. Further, the video stream may be formatted using known such formats e.g., MPEG2, MJPEG, MPEG4, H.263, H.264, and the like.

As described in greater detail below, the computer vision engine 135 may be configured to analyze this raw information to identify active objects in the video stream, classify the objects, derive a variety of metadata regarding the actions and interactions of such objects, and supply this information to a machine learning engine 140. In turn, the machine learning engine 140 may be configured to evaluate, observe, learn and remember details regarding events (and types of events) that transpire within the scene over time.

In one embodiment, the machine learning engine 140 receives the video frames and the results generated by the computer vision engine 135. The machine learning engine 140 may be configured to analyze the received data, build semantic representations of events depicted in the video frames, detect patterns, and, ultimately, to learn from these observed patterns to identify normal and/or abnormal events. In one embodiment, data describing whether a normal/abnormal behavior/event has been determined and/or what such behavior/event is may be provided to output devices 118 to issue alerts, for example, an alert message presented on a GUI interface screen. In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 analyzes each frame in real-time to derive a set of information about what is occurring within a given frame, the machine learning engine 150 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 135 for analysis. Similarly, the output from the computer vision engine 135 and machine learning engine 140 may be supplied over computer network 110 to other computer systems. For example, the he computer vision engine 135 and machine learning engine 140 may be installed on a server system and configured to process video from multiple input sources (i.e., from multiple cameras). In such a case, a client application 250 running on another computer system may request (or receive) the results of over network 110.

Figure 2:
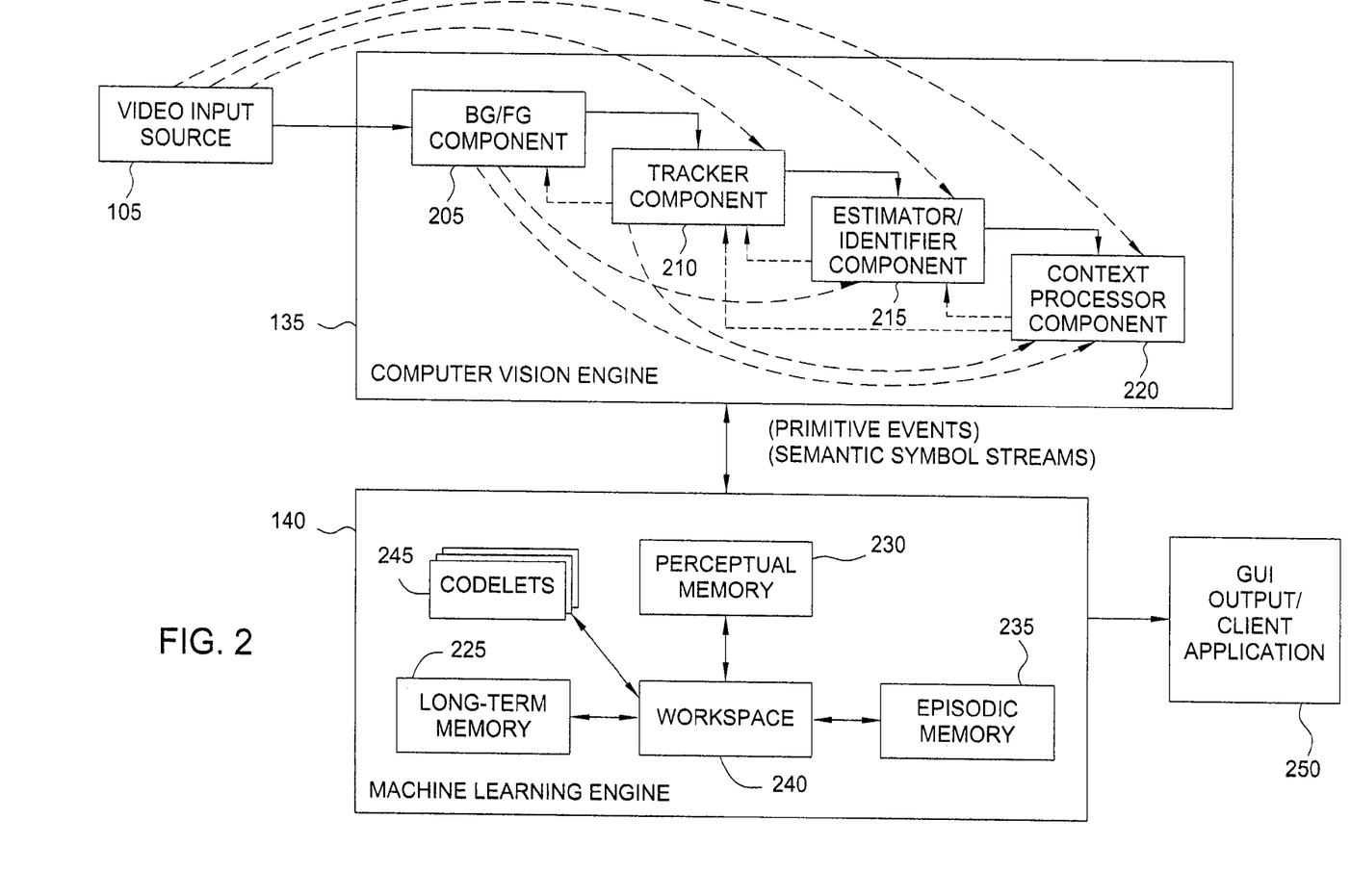
FIG. 2 further illustrates a computer vision engine and a machine learning engine of the behavioral recognition system shown in FIG. 1, according to one embodiment of the present invention.

FIG. 2 further illustrates components of the computer vision engine 135 and the machine learning engine 140 first illustrated in FIG. 1, according to one embodiment of the present invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows). In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case.

In one embodiment, the BG/FG component 205 may be configured to separate each frame of video provided by the video input source 105 into a stationary or static part (the scene background) and a collection of volatile parts (the scene foreground.) The frame itself may include a two-dimensional array of pixel values for multiple channels (e.g., RGB channels for color video or grayscale channels for black and white video). The BG/FG component 205 may be configured to generate a mask used to identify which pixels of the scene have been determined to depict foreground and, conversely, which pixels have been determined to depict scene background. The BG/FG component 205 then identifies regions of the scene that contain a portion of scene foreground (referred to as a foreground "blob" or "patch") and supplies this information to subsequent stages of the pipeline.

As described in greater detail below, the tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene.

The estimator/identifier component 215 may receive the output of the tracker component 210 and classify the tracked objects as being one of a known categories of objects. For example, in one embodiment, estimator/identifier component 215 may classify a tracked object as being something (e.g., as being a "person," a "vehicle"). Further, the estimator/identifier component may identify characteristics of the tracked object, e.g., for a person, gender or whether the person is carrying an object.

The context processor component 220 may receive the result form other stages of the pipeline (i.e., the tracked objects, the background and foreground models, and the results of the estimator/identifier component 215). Using this information, the context processor 220 may be configured to generate an annotated map of the scene segmented into spatially separated regions. The regions may be labeled as natural or man-made and sorted according to occluding region pairs (i.e., regions may be determined to be in front of (or behind) other regions).

The computer vision engine 135 may take the outputs of the components 205, 210, 215, and 220 and generate a symbolic representation describing the motions and actions of the tracked objects in the scene as a sequence of primitive behavioral events. For example, assume the computer vision engine 135 has identified a foreground object and classified that foreground object as being a vehicle. In such a case, the computer vision engine 135 may determine that the vehicle has engaged in some specified action. For example, a sequence of primitive events related to events occurring at a shopping-mall parking lot could include: "vehicle appears in scene," "vehicle moves to a given location," "vehicle stops moving," "person appears proximate to vehicle" "person moves," person leaves scene" "person appears in scene," "person moves proximate to vehicle," person disappears," "vehicle starts moving," and "vehicle disappears." This information, labeled in FIG. 2 as "primitive events" and "semantic symbol stream," is passed to the machine learning engine 140.

Illustratively, the machine learning engine 140 includes a long-term memory 225, a perceptual memory 230, an episodic memory 235, a workspace 240 and codelets 235. In one embodiment, the perceptual memory 220, the episodic memory 225, and the long-term memory 230 are used to identify patterns of behavior, evaluate events that transpire in the scene, and encode and store observations. Generally, the perceptual memory 230 receives the output of the computer vision engine 135. The episodic memory 235 stores data representing observed events with details related to a particular episode, e.g., information describing time and space details related on an event. That is, the episodic memory 235 may include details describing "what and where" something occurred within a scene such as a particular vehicle (car A) moved to a location believed to be a parking spot (parking spot 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as a sparse-distributed memory data structure.

Figure 3:
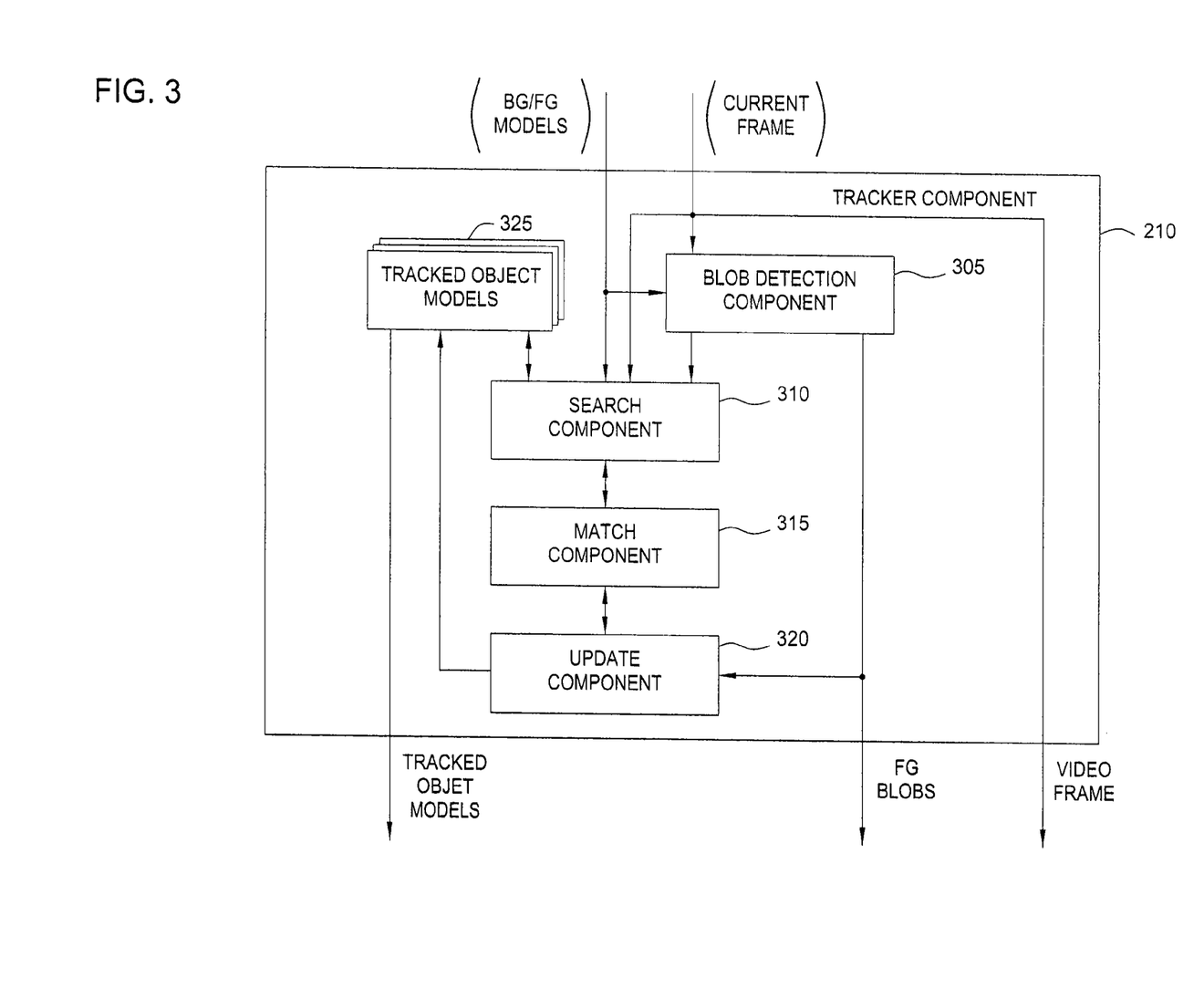
FIG. 3 illustrates an example embodiment of a tracker component of the computer vision engine shown in FIG. 2, according to one embodiment of the invention.

Generally, the workspace 215 provides a computational engine for the machine learning engine 140. For example, the workspace 215 may be configured to copy information from the perceptual memory 230, retrieve relevant memories from the episodic memory 235 and the long-term memory 245, select and invoke the execution of one of codelets 245. In one embodiment, each codelet 235 is a software program configured to evaluate different sequences of events and to determine how one sequence may follow (or otherwise relate to) another (e.g., a finite state machine). More generally, the codelet may provide a small software program configured to find interesting patterns. In turn, the codelet may create, reinforce, or modify memories in the episodic memory 225 and the long-term memory 230 (i.e., when a pattern is identified). By repeatedly scheduling codelets for execution, copying memories and percepts to/from the workspace 215, the machine learning engine 140 performs a cognitive cycle used to observe, and learn, about patterns of behavior that occur within the scene FIG. 3 illustrates an example embodiment of the tracker component 210 of the computer vision engine 135 shown in FIG. 2, according to one embodiment of the invention. As shown, the tracker component 210 includes a foreground (FG) blob detection component 305, a search component 310, a matcher component 315, and an update component 320. Additionally, tracker component 210 includes a set of tracked object models 325, representing objects identified over a sequence of video frames. As new objects are identified (and as currently known objects leave the scene) the tracker component 210 generates (or updates) a tracked object model 325 representing the object. Thus, the tracked object models 225 provide continuity from frame-to-frame, allowing the computer vision engine 135 and the machine-learning engine 140 to observe and follow a given object throughout the scene, over time.

Illustratively, information representing a BG/FG model of the scene along with a current frame is provided to the blob detection component 305. In turn, the blob detection component 305 may identify one or more "blobs" or "patches" of foreground. Typically, each such "blob" represents a contiguous patch of the foreground model depicting one (or more) objects then present in the scene. Once a set of foreground blobs have been identified, the search component 310 may search the blobs for each of the tracked objects believed to present in the scene.

In one embodiment, the search component 310 may be configured to search for tracked objects using a hierarchal block search. For example, FIG. 6A-B illustrates an example of a hierarchical block search used to locate a tracked object in successive frames of video, according to one embodiment of the invention.

Illustratively, a frame 605 depicts a vehicle $610_1$ driving down a hill, and a tracked object model 625 corresponds to the vehicle $610_1$. The tracked object model $625_1$ includes a bounding box $630_1$ around the object as well as a representation of each pixel determined by the tracker component 210 to depict the object (i.e., the vehicle). As shown in FIG. 6A, the model of the object is represented using an appearance based model, i.e., a model based on the actual color (or grayscale) values of each pixel included in the model. In other words, the tracked object model $625_1$ provides both the position and shape of the object in the scene and the appearance values for each pixel included in the model $625_1$.

A second frame $607_1$ depicts the next frame of video received by the computer vision engine 135 and the tracker component 210. As shown, the vehicle $610_2$ has progressed to the right and down and is depicted at a different angle. In one embodiment, the tracker component 210 maintains kinematic data for a tracked object (e.g., position, velocity, and acceleration) and uses this information to predict a future position of the object based on a current position (i.e., to predict the position of the vehicle in frame 607). The region of the predicted location is searched to determine whether the tracked object can be found at the predicted location. Illustratively, a first set of points 615 is superimposed over the frame $607_1$. In this example, each point 615 represents a point for the search component 310 to look for the object $610_2$ in the frame 607 (based on the predicted position) during a first pass of a hierarchical block search. After sampling the region surrounding each point 615 and comparing the appearance values to a corresponding region of the object in the model $625_1$, the region which most closely matches the vehicle is used for a second pass of the hierarchal block search. For example, frame $607_2$ shows points 635 with a more confined area used to continue search for the object $610_2$ (i.e., the vehicle) in frame 607. In one embodiment, the distance between points may be halved for each pass of the search (e.g., from a distance of 16 to 8 to 4 to 2 to 1). Thus, the hierarchical block search may continue until the tracker component 210 evaluates neighboring pixels and selects a final position believed to best match to the model $625_1$ of the object. In one embodiment, each search position identified by the searcher component 310 is evaluated using the matching component 315.

Figure 6A:
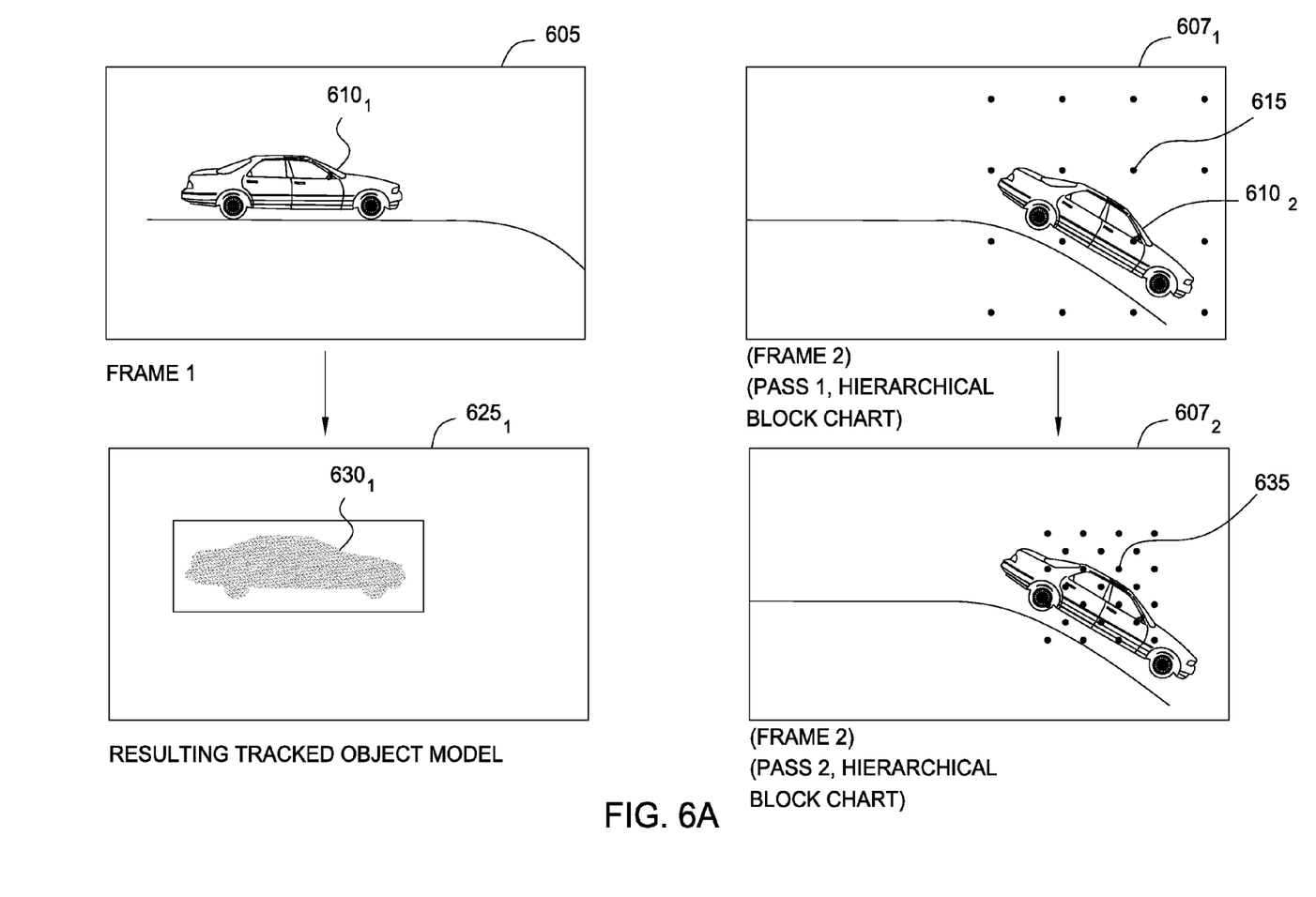
FIGS. 6A-B illustrates an example of a hierarchical block search used to locate a tracked object in successive frames of video, according to one embodiment of the invention.
Figure 6B:
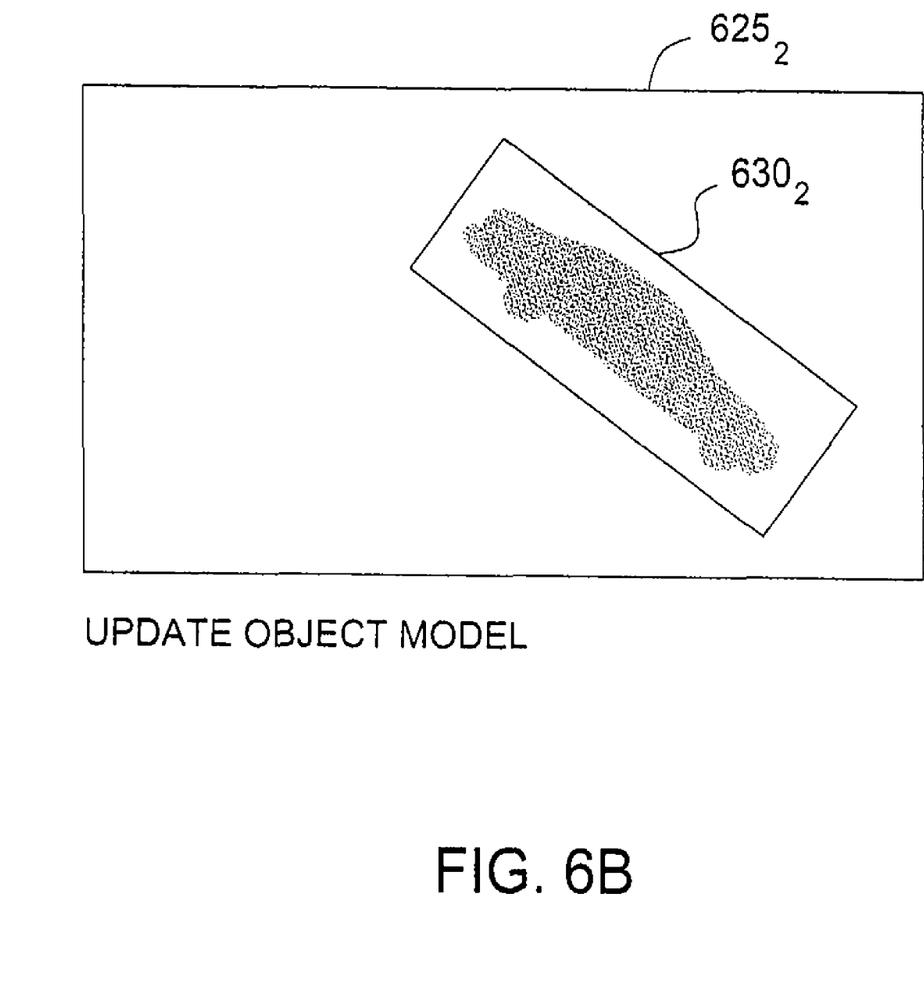

FIG. 6B illustrates an update to the object model $652_1$ of FIG. 6A. Specifically, appearance based model $625_2$ includes a bounding box $630_2$ enclosing the appearance model of the vehicle. That is, the tracked object model $625_2$ includes a bounding box $630_1$ around the vehicle as well as a representation of each pixel determined by the tracker component 210 to depict the object (i.e., the vehicle).

Figure 6C:
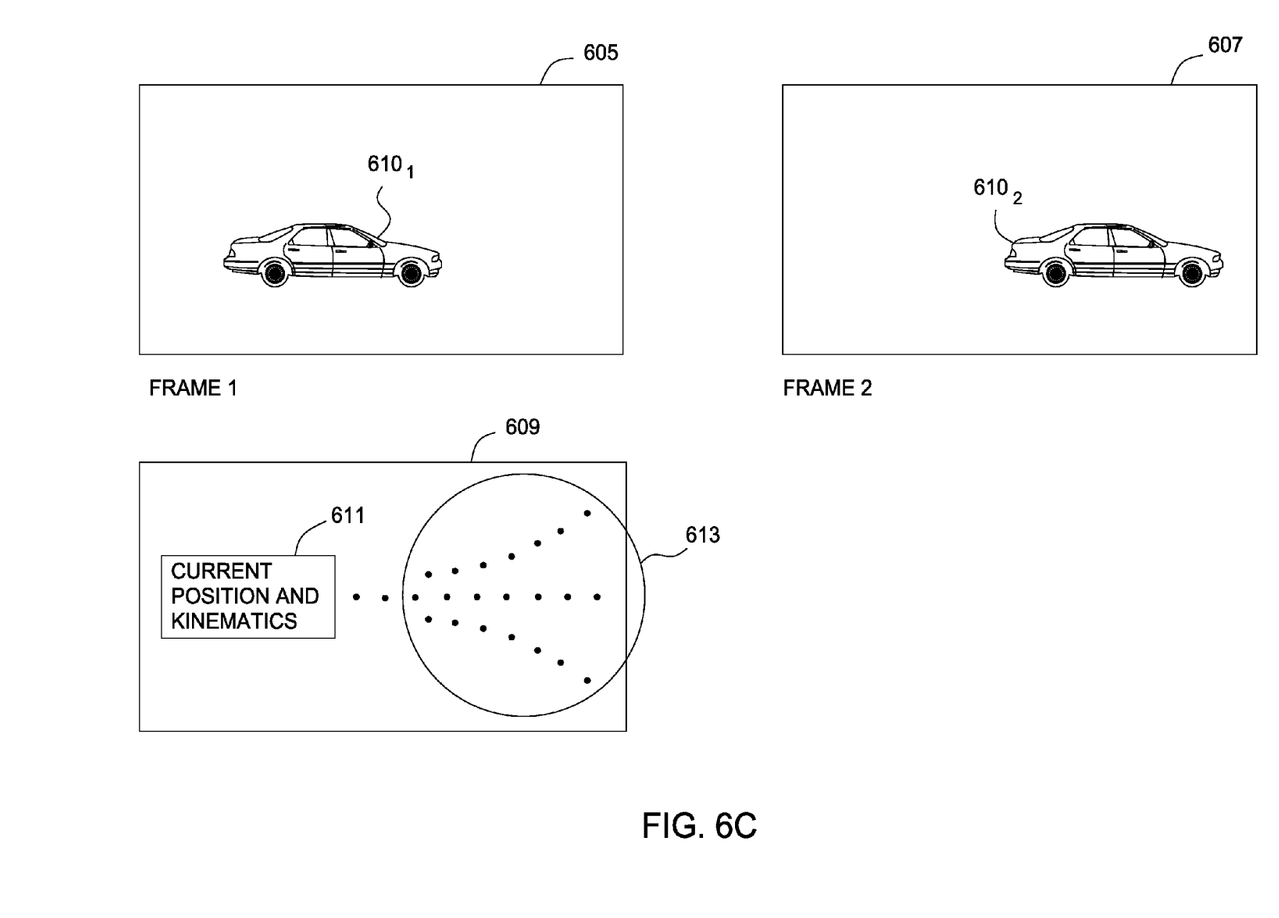
FIG. 6C illustrates an example of a particle-filter search used to locate a tracked object in a frame of video, according to one embodiment of the invention.

FIG. 6C illustrates an example of a particle-filter search used by the search component 310 of the tracker component 210 to locate a tracked object in a frame of video, according to one embodiment of the invention. FIG. 6C includes frames 605 and 607 depicting the object $610_1$ and $610_2$, respectively. As is known, a particle filter search, also known as sequential Monte Carlo method, provide a sophisticated model estimation techniques based on simulation. A particle filter is used approximate the distribution of interest by a properly weighted set of "particles" generated by importance sampling. For example, FIG. 6C illustrates a pane 609 representing a current position of the tracked object (and associated kinematics of the object) at 611 which may be used to generate a set of particles 613. Each particle provides a point for the search component 310 of the tracker to search for a tracked object (i.e., the position of the object $610_2$ in frame 607.

As described above, the matcher component 315 may use an appearance based approach to evaluate possible positions of a tracked object. However, in an alternative embodiment, a covariance based matching approach may be used. For example, FIG. 5B includes frames 605 and 607 depicting the object $610_1$ and $610_2$, respectively. However, rather then represent the tracked object using an appearance based model (e.g., using pixel RGB color values), covariance model $650_1$ generated based on the frame 605. Illustratively, the model $650_1$ includes a number of features of the model, including R, G, B color values, a first and second derivative (dx/dy), and an X/Y position. Of course, these and other features may be used. As is known, a covariance based tracker employs a covariance feature matrix of the selected features as the model of the object. Based on this model in the previous frame, the region in the current frame that has the minimum covariance distance from the model is found and assigned as the estimated location of that object. Thus, covariance model 6502 shows the updated covariance model of the object, based on the objection of the object $610_2$ in frame 607.

Returning to FIG. 3, the tracker component 210 also includes a matcher component 315 and the update component 320. In one embodiment, as described, the matcher component 315 may be configured to evaluate search positions determined by the search component 310, e.g., using a hierarchical block search or a particle filter search. Further, in one embodiment, both models may be used and assigned a measure of confidence, allowing the tracker to follow a given object using the technique that most accurately identifies the movement of that object throughout the scene in a particular case.

Figure 5A:
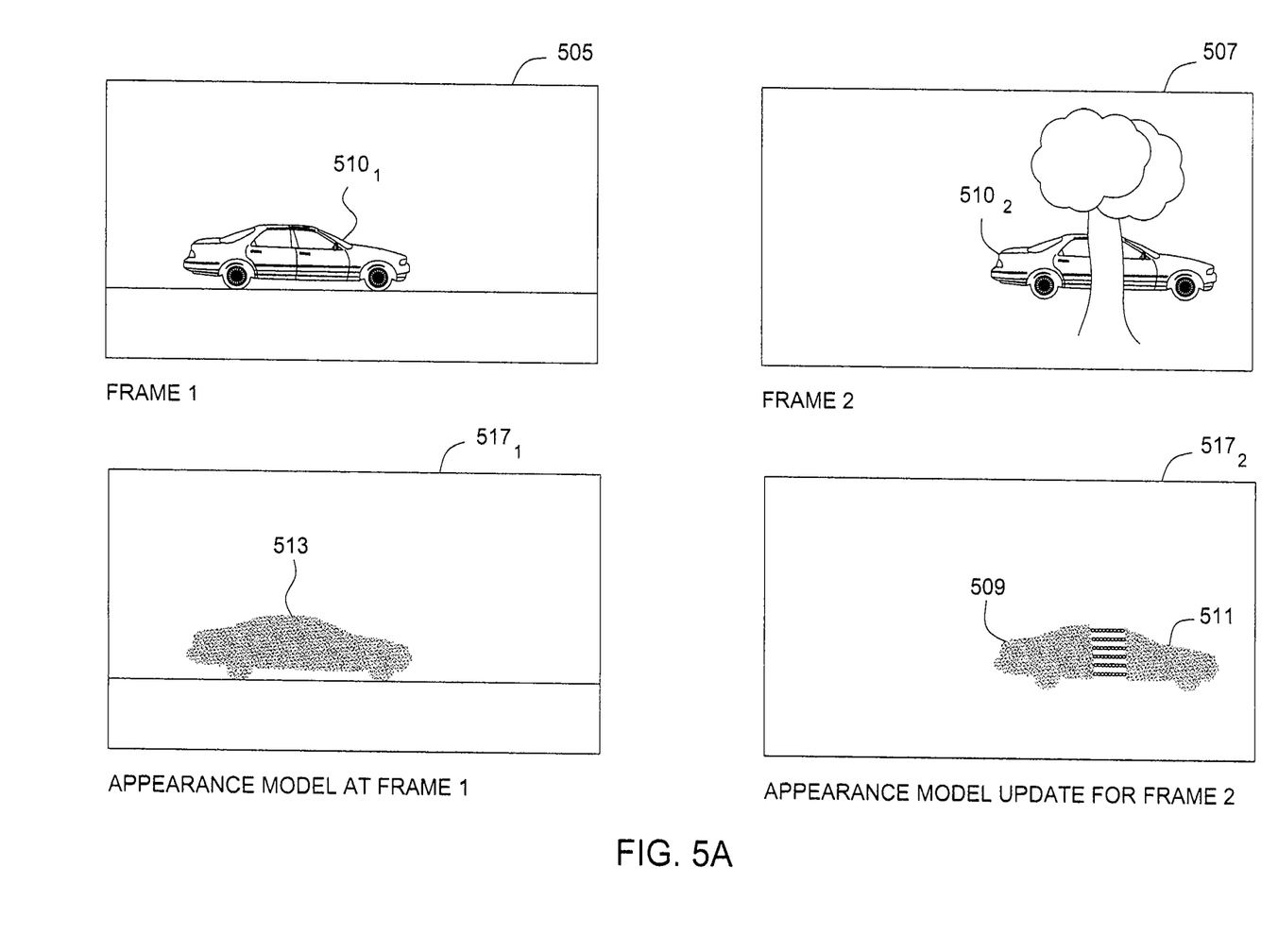
FIG. 5A illustrates an example of an appearance based object model generated by the tracker component shown in FIG. 4, according to one embodiment of the invention.
Figure 5B:
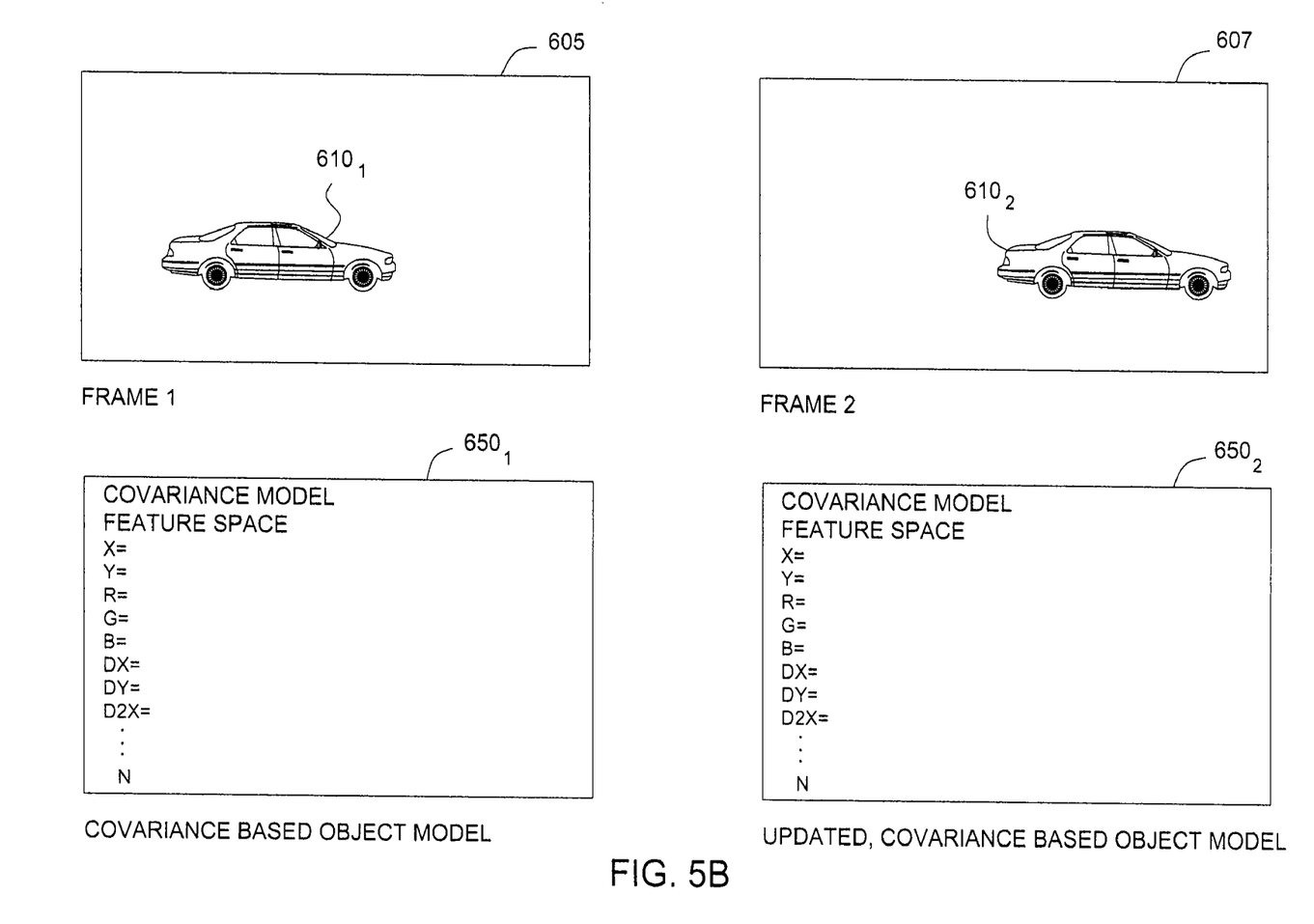
FIG. 5B illustrates an example of a covariance based object model generated by the tracker component shown in FIG. 4, according to one embodiment of the invention.

Once the best matching position for an object being tracked is identified, the update component 320 may update the tracked object model 325 for that object. For example, FIGS. 5B and 6B illustrate an updated covariance based model $650_2$ and an updated appearance based model $652_2$, respectively, for the vehicle depicted in frames 605 and 607. Note however, in these examples, the frames 605 and 607 illustrate a single tracked object. Of course, multiple objects (both foreground and background) are expected to be observed and tracked by the computer vision engine 135 and the tracker component 210.

In one embodiment, information regarding the region ordering of the scene may be used to maintain an appearance model of a given object. For example, FIG. 5A includes frames 505 and 507 depicting a vehicle object $510_1$ and $510_2$, respectively. At the same time, an appearance model $517_1$ for frame 505 includes the complete vehicle. Further, frame 507 depicts the vehicle object $510_2$ partially occluded by a tree. In one embodiment, the updater component 320 may be configured to evaluate context information supplied by the context processor component 220 when updating the tracked object model 325 for a given tracked object. An appearance model $517_2$ illustrates this result by including a first region 509 and a second region 511. In this example, region 509 and 511 provide an appearance model updated to reflect the position and pixel color values of the vehicle object $510_2$, as depicted by frame 507. However, the pixels occluded by the tree in frame 507 are not used to update the appearance model of the vehicle object $510_2$.

In one embodiment, the update component 320 may also be configured to discover new objects appearing in a given frame and seed an appearance model used to track such an object in subsequent frames. For example, if a foreground patch does not adequately match any tracked object model, then update component 320 may seed a new tracked object 325. If an appearance based model is used, then the new tracked object model may be generated by assigning the pixel appearance values (e.g., the RGB values) to the new model. Alternatively, if a covariance based model is used, the update component may compute the covariance matrix of the features for that new object and may use that covariance matrix as a model to track that object in the subsequent frames. Similarly, the update component 320 may also be configured to remove tracked objects determined to have left the scene as well as split one tracked object into two. For example, returning to the illustration of a vehicle being parked, as the tracker follows the vehicle coming to a stop, and once a person begins to exist from the vehicle, the tracker may recognize that the person and the vehicle represent distinct objects. In one embodiment, the update component may split a tracked object once the pixels assigned to that object occupy two (or more) discontinuous regions. Lastly, the update component 320 may be configured to resolve two interacting object models by selecting which pixels of a foreground patch to assign to one of the objects and which pixels to assign to the other. As one of ordinary skill in the art will recognize, the update component 320 may use a variety of technique for "de-noising" competition for pixels between two objects interacting with one another in the foreground patch of a frame.

Figure 4:
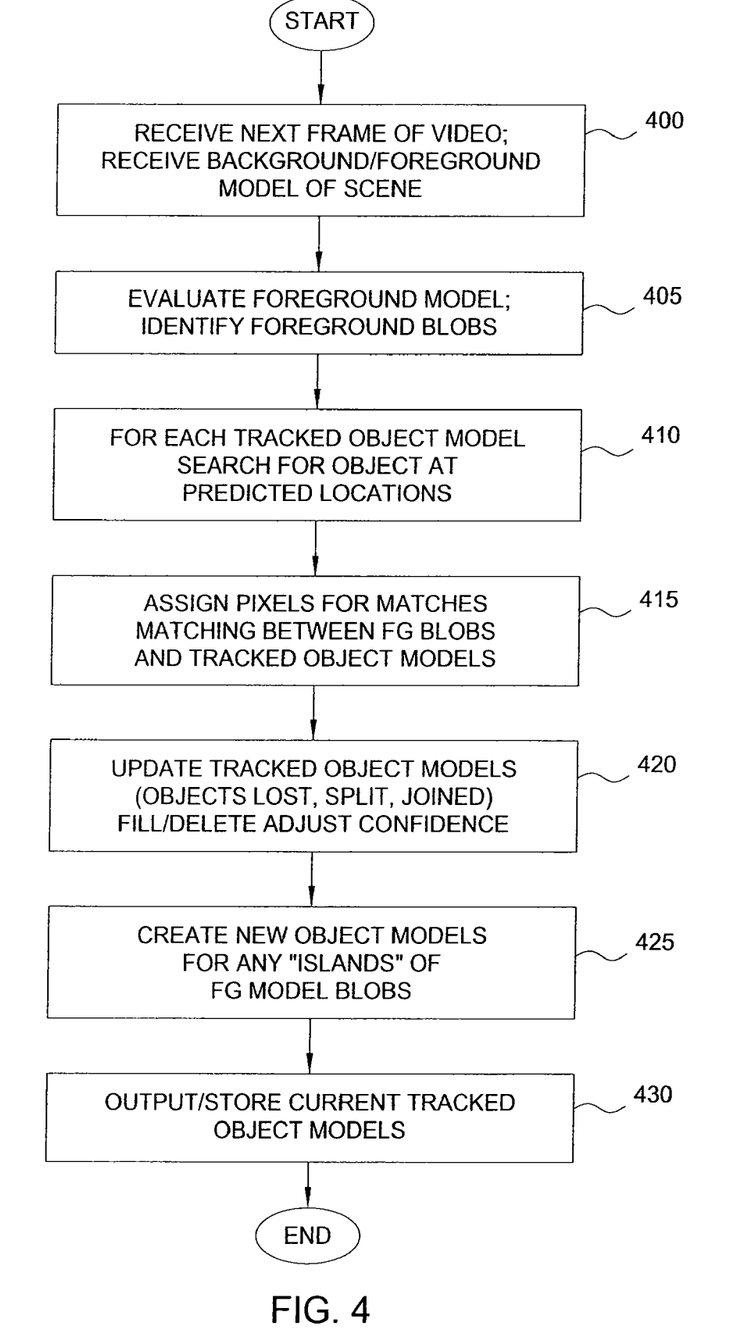
FIG. 4 illustrates a method for the tracker component of a computer vision engine to detect, identify, and track objects moving about a scene, as captured by a sequence of video frames, according to one embodiment of the invention

FIG. 4 illustrates a method for the tracker component 210 of a computer vision engine 135 to detect, identify, and track objects moving about a scene, as captured by a sequence of video frames, according to one embodiment of the invention. As shown, the method begins at step 405 where the tracker component 210 receives a next frame of video along with a background/foreground model of a scene. For example, FIGS. 5A-5B and FIGS. 6A-6C illustrate different examples of a vehicle captured in a first frame and a second frame, while being driven across the field of vision of a camera.

At step 405, the tracker component 210 may evaluate the foreground model to identify a collection of foreground patches or blobs. At step 410, for each tracked object model, the tracker component 210 may evaluate a predicted location (and the foreground patches) to search for the tracked object in the frame of video received at step 400. For example, as described above, the tracker component 210 may use a hierarchical block search to identify foreground patches that may depict the tracked object in the frame of video received at step 400. Alternatively, a particle filter search may be used.

At step 415, pixels from a foreground patch (or patches) most closely matching a given tracked object may be assigned to that tracked object. Further, in one embodiment, additional pixels may be assigned to that tracked object using a flood fill approach. Doing so allows changes in orientation of an object tracked by the tracker component 210 to be included in the object model representation of that object. similarly, pixels believed to be occluded by another element of scene may remain part of the tracked object model, but such pixels are not updated to include the appearance (or covariance features) of the tracked object.

At step 420, the tracked object models may be updated. For example, FIGS. 5A-5B and 6A-6C illustrate different examples of appearance based and covariance based object models updated for frames 507 and 607, respectively, depicting a vehicle being driven across the field of vision of a video input source. As described, the update process may include splitting an existing object as well as removing a tracked object model for things believed to have left the scene. At step 425, the tracker component 425 may create new object models for any foreground patches not assigned to an existing object model at steps 400-420. This may result from new objects entering the field of vision of the camera or objects initially joined that later separate in the scene (e.g. a person exiting a parked car). At step 425, the tracker component 210 may output/store the current tracked object models generated for the frame of video received at step 400. For example, as described above, the estimator/identifier component 215 may receive the output of the tracker and classify a tracked object as being something (e.g., as being a "person," a "vehicle").

Advantageously, as described herein, embodiments of the invention provide a tracker component for a computer vision engine of a machine-learning based behavior-recognition system. The behavior-recognition system may be configured to learn, identify, and recognize patterns of behavior by observing a video stream (i.e., a sequence of individual video frames). The tracker component may be configured to identify objects depicted in the sequence of video frames and to generate, match, and update computational models of such objects.

In one embodiment, the tracker component receives a current frame of video along with a background/foreground model of the scene depicted by the frame. The tracker component then attempts to track the movement of a given patch as the object depicted in the video moves about the screen. Further, the tracker component may include a search component, matching component and an update component. The search component may be configured to search for a given object being tracked from one frame to the next. The matching component may be configured to evaluate and score a match between a given foreground blob and a tracked object. The update component may update the model representing a given object, based on changes that occur from frame-to-frame, e.g., as an individual walks across the scene. Additionally, the update component may merge, split, or create models of newly discovered objects as such events are identified from frame-to-frame.

While the foregoing is directed to embodiments of the present invention, other and further embodiments of the invention may be devised without departing from the basic scope thereof, and the scope thereof is determined by the claims that follow.

What is claimed is:

1. A method for tracking one or more objects depicted in a sequence of video frames, comprising:
 receiving a current video frame, of the sequence of video frames;
 receiving a background model of a scene depicted by the sequence of video frames and one or more foreground patches, wherein each foreground patch includes a set of pixels covered by the foreground patch in the current video frame;
 for each of the one or more tracked objects:
  identifying, a predicted location of the tracked object, identifying, at the predicted location, one or more foreground patches, searching for the tracked object at a plurality of points in the scene using a model of the tracked object generated from one or more previous video frames, selecting one of the searched points as a position of the tracked object in the current video frame, and updating the model of the tracked object based on the selected position of the tracked object in the current video frame;

passing the updated models of the one or more tracked objects to a machine learning engine; and generating, by the machine learning engine, from the passed models, one or more semantic representations of behavior engaged in by the tracked objects in the scene over the sequence of video frames, wherein the machine learning engine is configured to learn patterns of behavior engaged in by the tracked objects in the scene over the plurality of video frames and to identify occurrences of the patterns of behavior engaged in by the tracked objects.

2. The method of claim 1, further comprising:

identifying one or more foreground patches including a pixels not assigned to one of the tracked objects; and seeding a new object model for tracking the object depicted in the pixels not assigned to one of the tracked objects in subsequent frames of video.

3. The method of claim 1, wherein searching at a plurality of points of the one or more foreground patches for the tracked object comprises performing a hierarchical block search.

4. The method of claim 1, wherein searching at a plurality of points of the one or more foreground patches for the tracked object comprises performing a particle filter search.

5. The method of claim 1, wherein the tracked object model for a given object comprises a feature covariance model that is estimated using a set of weighted/unweighted updates of covariance matrix of the given object depicted in a plurality of frames, of the sequence of video frames.

6. The method of claim 1, wherein the tracked object model comprises an appearance based model, and wherein each pixel of the appearance based model is updated with one or more corresponding appearance values of that pixel in the current frame of video.

7. The method of claim 1, further comprising, classifying at least one of tracked objects using a trained classifier, wherein the tracked object is classified as being one of a vehicle, a person, an other, or unknown.

8. The method of claim 1, further comprising, receiving a region ordering of the scene, wherein the region ordering specifies pairs of occluding and non-occluding regions of the scene;

determining that at least a portion of the tracked object is occluded by the one of the ordered regions, and wherein updating the model of the tracked object includes updating the position of the model and updating portions of the model not occluded by one of the ordered regions.

9. The method of claim 1, wherein the predicted location is identified based on a previous location of the tracked object and on kinematic data associated with the tracked object model.

10. A computer-readable storage medium containing a program which, when executed by a processor, performs an operation for tracking one or more objects depicted in a sequence of video frames, the operation comprising:

receiving a current video frame, of the sequence of video frames;

receiving a background model of a scene depicted by the sequence of video frames and one or more foreground patches, wherein each foreground patch includes a set of pixels covered by the foreground patch in the current video frame;

for each of the one or more tracked objects:

identifying, a predicted location of the tracked object, identifying, at the predicted location, one or more foreground patches, searching for the tracked object at a plurality of points in the scene using a model of the tracked object generated from one or more previous video frames, selecting one of the searched points as a position of the tracked object in the current video frame, and updating the model of the tracked object based on the selected position of the tracked object in the current video frame; and passing the updated models of the one or more tracked objects to a machine learning engine; and generating, by the machine learning engine, from the passed models, one or more semantic representations of behavior engaged in by the tracked objects in the scene over the sequence of video frames, wherein the machine learning engine is configured to learn patterns of behavior engaged in by the tracked objects in the scene over the plurality of video frames and to identify occurrences of the patterns of behavior engaged in by the tracked objects.

11. The computer-readable storage medium of claim 10, wherein the operation further comprises:

identifying one or more foreground patches including a pixels not assigned to one of the tracked objects; and seeding a new object model for tracking the object depicted in the pixels not assigned to one of the tracked objects in subsequent frames of video.

12. The computer-readable storage medium of claim 10, wherein searching at a plurality of points of the one or more foreground patches for the tracked object comprises performing a hierarchical block search.

13. The computer-readable storage medium of claim 10, wherein searching at a plurality of points of the one or more foreground patches for the tracked object comprises performing a particle filter search.

14. The computer-readable storage medium of claim 10, wherein the tracked object model for a given object comprises a feature covariance model that is estimated using a set of weighted/unweighted updates of covariance matrix of the given object depicted in a plurality of frames, of the sequence of video frames.

15. The computer-readable storage medium of claim 10, wherein the tracked object model comprises an appearance based model, and wherein each pixel of the appearance based model is updated with one or more corresponding appearance values of that pixel in the current frame of video.

16. The computer-readable storage medium of claim 10, wherein the operation further comprises, classifying at least one of tracked objects using a trained classifier, wherein the tracked object is classified as being one of a vehicle, a person, an other, or unknown.

17. The computer-readable storage medium of claim 10, wherein the operation further comprises:

receiving a region ordering of the scene, wherein the region ordering specifies pairs of occluding and non-occluding regions of the scene; and determining that at least a portion of the tracked object is occluded by the one of the ordered regions, and wherein updating the model of the tracked object includes updating the position of the model and updating portions of the model not occluded by one of the ordered regions.

18. The computer-readable storage medium of claim 10, wherein the predicted location is identified based on a previous location of the tracked object and on kinematic data associated with the tracked object model.

19. A system comprising,
a video input source configured to provide a sequence of video frames, each depicting a scene;
a processor; and
a memory containing a computer vision engine which when executed by the processor is configured to perform an operation for tracking one or more objects depicted in a sequence of video frames, the operation comprising:
receiving a current video frame, of the sequence of video frames;
receiving a background model of a scene depicted by the sequence of video frames and one or more foreground patches, wherein each foreground patch includes a set of pixels covered by the foreground patch in the current video frame;
for each of the one or more tracked objects:
identifying, a predicted location of the tracked object, identifying, at the predicted location, one or more foreground patches,
searching for the tracked object at a plurality of points in the scene using a model of the tracked object generated from one or more previous video frames, of the sequence of video frames,
selecting one of the searched points as a position of the tracked object in the current video frame, and
updating the model of the tracked object based on the selected position of the tracked object in the current video frame; and
passing the updated models of the one or more tracked objects to a machine learning engine; and
generating, by the machine learning engine, from the passed models, one or more semantic representations of behavior engaged in by the tracked objects in the scene over the sequence of video frames, wherein the machine learning engine is configured to learn patterns of behavior engaged in by the tracked objects in the scene over the plurality of video frames and to identify occurrences of the patterns of behavior engaged in by the tracked objects.

20. The system of claim 19, wherein the operation further comprises:
identifying one or more foreground patches including a pixels not assigned to one of the tracked objects; and
seeding a new object model for tracking the object depicted in the pixels not assigned to one of the tracked objects in subsequent frames of video.

21. The method of claim 19, wherein searching at a plurality of points of the one or more foreground patches for the tracked object comprises performing a hierarchical block search.

22. The system of claim 19, wherein searching at a plurality of points of the one or more foreground patches for the tracked object comprises performing a particle filter search.

23. The system of claim 19, wherein the tracked object model for a given object comprises a feature covariance model that is estimated using a set of weighted/unweighted updates of covariance matrix of the given object depicted in a plurality of frames, of the sequence of video frames.

24. The system of claim 19, wherein the tracked object model comprises an appearance based model, and wherein each pixel of the appearance based model is updated with one or more corresponding appearance values of that pixel in the current frame of video.

25. The system of claim 19, further comprising,
receiving a region ordering of the scene, and wherein region ordering specifies a depth ordering for one or more regions of the scene;
determining that at least a portion of the tracked object is occluded by the one of the ordered regions, and wherein updating the model of the tracked object includes updating the position of the model and updating portions of the model not occluded by one of the ordered regions.

* * * * *